US006657353B1

(12) United States Patent
Patarchi

(10) Patent No.: US 6,657,353 B1
(45) Date of Patent: Dec. 2, 2003

(54) PERMANENT MAGNET ELECTRIC MACHINE WITH ENERGY SAVING CONTROL

(76) Inventor: Alberto Patarchi, Viale della Marina, 3 - 00122 Ostia Lido (IT)

( * ) Notice: Subject to any disclaimer, the term of this patent is extended or adjusted under 35 U.S.C. 154(b) by 0 days.

(21) Appl. No.: 09/890,238

(22) PCT Filed: Nov. 25, 1999

(86) PCT No.: PCT/IT99/00388

§ 371 (c)(1),
(2), (4) Date: Jul. 30, 2001

(87) PCT Pub. No.: WO00/45501

PCT Pub. Date: Aug. 3, 2000

(30) Foreign Application Priority Data

Jan. 28, 1999 (IT) ...................... RMA000066

(51) Int. Cl.[7] ................................. H02K 1/00
(52) U.S. Cl. ...................... 310/185; 310/49 R; 310/254
(58) Field of Search ........................ 310/156.01–156.84, 310/179–208, 49 R, 254, 258, 259, 166–168, 154.01–154.49, 181; 318/254, 138

(56) References Cited

U.S. PATENT DOCUMENTS

| | | | | |
|---|---|---|---|---|
| 3,277,324 A | * | 10/1966 | Beaudoin et al. | ...... 310/154.35 |
| 3,344,325 A | * | 9/1967 | Sklaroff | ........................ 318/696 |
| 4,315,171 A | * | 2/1982 | Schaeffer | .................. 310/49 R |
| 4,591,746 A | * | 5/1986 | Kamiyama | .............. 123/149 E |
| 4,719,382 A | * | 1/1988 | Listing | ........................ 310/187 |
| 4,754,207 A | * | 6/1988 | Heidelberg et al. | ......... 310/185 |
| 4,864,199 A | | 9/1989 | Dixon | ........................ 318/254 |
| 5,726,560 A | * | 3/1998 | Eakman et al. | ................ 322/89 |
| 6,380,646 B1 | * | 4/2002 | Bernauer et al. | ............ 310/254 |
| 6,388,346 B1 | * | 5/2002 | Lopatinsky et al. | .......... 310/63 |
| 6,492,756 B1 | * | 12/2002 | Maslov et al. | ......... 310/156.12 |

* cited by examiner

*Primary Examiner*—Dang Le
(74) *Attorney, Agent, or Firm*—Browdy and Neimark, P.L.L.C.

(57) ABSTRACT

The present invention relates to a generator of energy as a dynamo-electric machine with employment of the parallel and superposed forces, of "artificial electromagnetic reaction" between the primary (2) and secondary (3) of "natural ferromagnetic reaction" between the secondary and the primary. The primary comprises one or more pairs ($C_1$, $C_2$) of polar expansions ($E_1$, $E_2$; $E_3$, $E_4$), mechanically separated and electrically offset in phase from each other by a polar step (p) and each provided with a ferromagnetic core ($A_1$, $A_2$; $A_3$, $A_4$) and with at least an electromagnetic coil ($B_1$, $B_1'$, $B_2$, $B_2'$, $B_3$, $B_3'$, $B_4$, $B_4'$), the secondary (3) comprises a succession of alternate permanent magnets ($3_1$, $3_2$, ..., $3_{10}$), and a related control system (5). Each polar step (p) spans half a permanent magnet of said alternate permanent magnets ($3_1$, $3_2$, ... $3_{10}$), equal to a quarter of a complete cycle ($p_1$ or $p_2$), the magnetic forces being balanced due to the characteristic paired disposition of the polar expansions active separately during the conductor steps ($p_1$) and its ferromagnetic cores active separately during the neutral steps in "natural" attraction ($p_2$) with the permanent magnets.

16 Claims, 5 Drawing Sheets

PERMANENT MAGNET ELECTRIC MACHINE WITH ENERGY SAVING CONTROL

REFERENCE TO RELATED APPLICATIONS

The present application is the national stage under 35 U.S.C. 371 of international application PCT/IT99/00388, filed Nov. 25, 1999, which designated the United States, and which international application was published under PCT Article 21(2) in the English language.

TECHNICAL FIELD

The present invention relates to an energy generator as a dynamo-electric machine with separate employment of the interacting forces and their balancing with permanent magnets.

The term "dynamo-electric machine" designates any machine which converts mechanical energy into electrical energy and vice versa. The type of machine whereto the present invention refers is the one wherein a primary comprises a multiplicity of polar expansions and a secondary comprises a succession of heteronomous alternated permanent magnets.

BACKGROUND ART

It is well known that both in motors and in generators of this kind, electromagnets act by attraction or repulsion over the entire pitch of the magnets in two semi-cycles, that is to say at full cycles from permanent magnet to permanent magnet, and hence in none of the known motors or generators is the active effect of the interaction of the magnets with the highly permeable ferromagnetic cores taken into account, nor is the equilibrium i.e. the balancing of the ferromagnetic forces which cancel out the permanent magnetic resistant torque to pass from one permanent magnet to the other.

DISCLOSURE OF INVENTION

Although in the considerations that follow reference shall be made, for the sake of convenience, mostly to motors, the same considerations apply for generators as well.

In particular, the invention constituting the subject of the invention is aimed at determining at relative disposition between the pairs of electromagnets of the primary and the permanent magnets of the secondary which is able to harmonise the forces at play, whose magnetic nature is respectively permanent, ferromagnetic and electromagnetic.

Another aim of the present invention is to reach a high efficiency in the transformation of electrical into mechanical energy and vice versa thanks to an appropriate electrical power supply of the electromagnets of the primary in their interaction with the permanent magnets of the secondary.

Yet another aim of the present invention is to provide an electric motor which can be controlled by an appropriate control system according to the characteristics required in each particular case, with adequate sensors such as optical, magnetic, resistive, inductive or other types of transducers which, through electronic circuits with transistors, thyristors, or triac, drive the supply of power to the machine, as well as common brush collectors, able to provide current at alternating polar steps to the coils offset by a polar step, first one than the other in succession for four steps of complete cycle.

The invention, as it is characterised by the claims that follow, solves the problem of providing a dynamo-electric machine with the harmonisation of the interacting forces, of the type having a primary comprising one or more pairs of polar expansion positioned one at the centre of the permanent magnets and the others astride two permanent magnets, mutually distanced by a polar step and each provided with a ferromagnetic core and with at least one electromagnetic coil, and a secondary comprising a succession of alternate heteronomous permanent magnets, and a related control system, which from a general point of view, is characterised in that each polar step of electrical conduction spans half permanent magnet of said alternate heteronomous permanent magnets and in that said electrical conduction is driven at alternate phases: in the first step the coil or coils in negative feedback facing the centre of the permanent magnet, then in the second step the coil or coils in negative feedback which were astride the permanent magnets and which are in turn taken to the centre, then the third step again the coil or coils in negative feedback of the first step but with opposite electrical polarity still in negative feedback, then the fourth step again the coil or coils in negative feedback of the second step with opposite electrical polarity still in negative feedback closing a complete electrical conduction cycle, the two phases are carried out for separate two fourths by a first coil of the balancing pair and for other separate two fourths by a second coil of the balancing pair offset by a polar step and always with electrical polarity suitable to obtain the negative feedback with the opposed permanent magnets and always at the output of each half alternate heteronomous permanent magnet. The invention lets the "natural" permanent magnetic force active in attraction of the alternate heteronomous permanent magnets with the high-permeability ferromagnetic cores be always unbalanced in attraction, first a ferromagnetic core than the other concurring to create a complete parallel and superposed dual cycle of "natural" mechanical energy which goes to the axis of the dynamo-electric machine together with the cycle of "artificial" electromagnetic energy transformed by negative feedback with the consequent addition of the two separate and parallel energies, obtaining a high efficiency of the machine of the invention.

Although in the present description the invention is described with reference to a rotatory dynamo-electric machine, it can also be applied to linear machines or annular linear machines and to devices for partial servo-controls.

Further features and advantages of the present invention shall become more readily apparent from the detailed description that follows, of preferred embodiments illustrated purely by way of non-limiting indication in the accompanying drawings.

DESCRIPTION OF THE ILLUSTRATIVE EMBODIMENT

Figure 1:
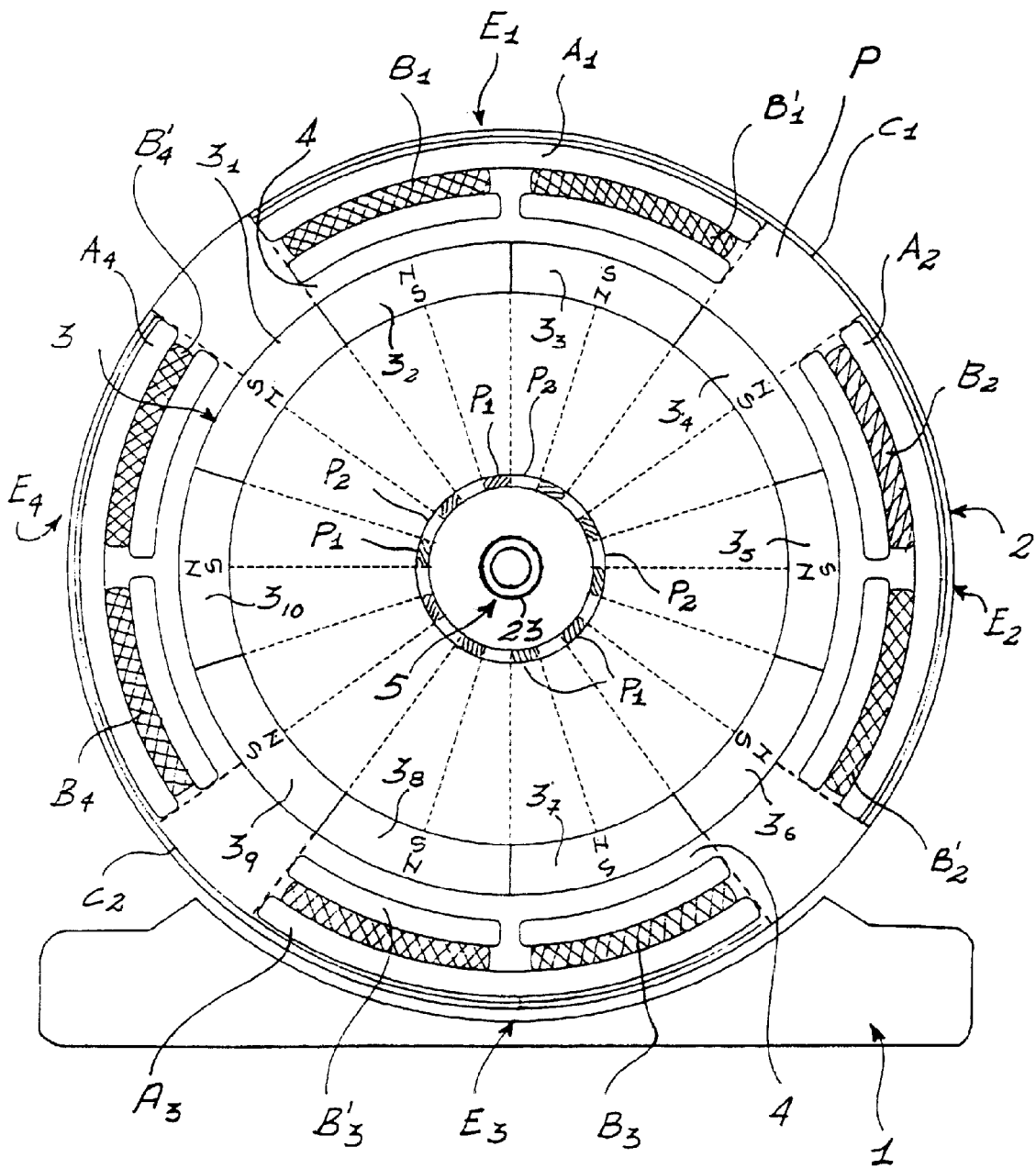
FIG. 1 schematically shows in cross section view an embodiment of a dynamo-electric machine according to the present invention.

According to the present invention, FIG. 1 schematically shows in cross section view an embodiment of an electric motor, taken for instance from an energy generator as dynamo-electric machine according to the present invention.

As shown in FIG. 1, on a support base 1 is mounted a stator 2, the primary of the machine, coaxially to whose interior is a rotor 3, the secondary. In the stator 2 is provided one or more pair of polar expansions, two in the example shown, indicated as $C_1$ and $C_2$. The polar expansions $E_1$, $E_2$, $E_3$, $E_4$ and the pair $C_1$ with $C_2$ are mutually separated by a polar step (p), i.e. the distance measured on the air gap arc between the start of a permanent magnet and its centre (half magnet). Each polar expansion ($E_1$, $E_2$, $E_3$, $E_4$) is provided with a horseshoe shaped ferromagnetic core ($A_1$, $A_2$, $A_3$, $A_4$), and with electromagnetic coils ($B_1$, $B_1'$, $B_2$, $B_2'$, $B_3$, $B_3'$, $B_4$, $B_4'$). In the secondary, the rotor 3 is provided with a succession of alternate heteronomous permanent magnets $3_1, 3_2, \ldots, 3_{10}$, separated from the polar expansions $E_1$, $E_2$, $E_3$, $E_4$ by an air gap 4. Further provided is a system for controlling the motor, of a known kind, schematically illustrated in the brush collector 5, characterised by neutral polar steps ($p_2$) and conductor polar steps ($p_1$) for the alternating electrical switching of the coils ($B_1$, $B_1'$, $B_2$, $B_2'$) or ($B_3$, $B_3'$, $B_4$, $B_4'$), with polarity inversion due to the negative feedback with the heteronomous alternate permanent magnets on the output polar step of each half magnet.

In other words, the machine comprises one or more pairs $C_1$, $C_2$ of polar expansions, $E_1$ and $E_3$, $E_2$ and $E_4$, mechanically and electrically distanced by a polar step (p) equal to a fourth of a cycle, or "half a permanent magnet" 3 whereof one expansion, $E_1$ and $E_3$, positioned opposing the full position of the alternated heteronomous permanent magnets $3_2$ and $3_3$, $3_7$ and $3_8$, and the other, $E_2$ and $E_4$, astride the permanent magnets, $3_4$, $3_5$ and $3_5$, $3_6$, $3_9$, $3_{10}$ and $3_{10}$, $3_1$, obtaining as a result a balanced equilibrium of the ferromagnetic torque forces interacting between the high permeability cores, $A_1$ and $A_2$, $A_3$ and $A_4$, with the alternated heteronomous permanent magnets, $3_1$, $3_2$, ?, $3_{10}$, and an electrical offset between the electromagnetic coils of the pair $B_1$, $B_1'$ and $B_2$, $B_2'$, $B_3$, $B_3'$ and $B_4$, $B_4'$, for the contiguous closure of the alternate steps superposed in the two complete and separate cycles of positive and negative energy on two heteronomous permanent magnets of opposite polarity in four fourths of a cycle (12, 14, 13 and 15; 16, 18, 19 and 17), each electromagnetic coil of the pair or group of coils equally positioned in phase ($B_1$, $B_1'$, $B_3$ and $B_3'$; $B_2$, $B_2'$, $B_4$ and $B_4'$) alternatively act for two separate fourths of a cycle with "artificial electromagnetic or mechanical energy" (12 and 13; 14 and 15) during the conductor steps ($p_1$) and for two separate fourths of a cycle with "natural ferromagnetic energy" (16 and 17; 18 and 19) during the neutral steps ($p_2$) electrically isolated, through the related control system 5, completing the two cycles of separate, consecutive, superposed and parallel "artificial" energy 12, 14, 13 and 15 plus the "natural" energy 16, 18, 19 and 17. When the dynamo-electric machine operates as a generator of mechanical energy, i.e. as a motor, each electromagnetic coil or group of coils ($B_1$, $B_1'$, $B_3$ and $B_3'$; $B_2$, $B_2'$, $B_4$ and $B_4'$) equally positioned are powered with positive and negative electrical current to obtain the negative feedback from the centre of the permanent magnets for the polar step ($p_1$) until the end of the permanent magnets at alternating steps 12, 14, 13 and 15 and contiguous for a complete repulsion cycle on two magnets of opposite polarity and for two separate fourths each (12 and 14; 13 and 15). whilst the "natural" cycle of permanent magnetic attraction is conducted by the ferromagnetic cores ($A_1$, $A_3$; $A_2$, $A_4$) in parallel and superimposed to the "artificial" cycle during the neutral polar steps ($p_2$) of the non-powered coils (16, 18, 19 and 17) also for two separate two fourths each (16 and 17; 18 and 19); vice versa when the dynamo-electric machine operates as a generator of electrical energy it is powered with mechanical energy aided by the complete cycle of "natural" magnetic attraction during the neutral steps ($p_2$).

The illustrated embodiment of a polar expansion is related to an ideal circuit with the closure of the electromagnetic flow in a pair of successive permanent magnets with opposite polarity.

Hereafter, the description shall show how a dynamo-electric machine thus realised presents a harmonisation of the interacting forces and, as a consequence, a high efficiency.

For the sake of simplicity hereafter the case shall be considered of polar expansions not interacting with pairs of permanent magnets but with one permanent magnet at a time.

Figure 2:
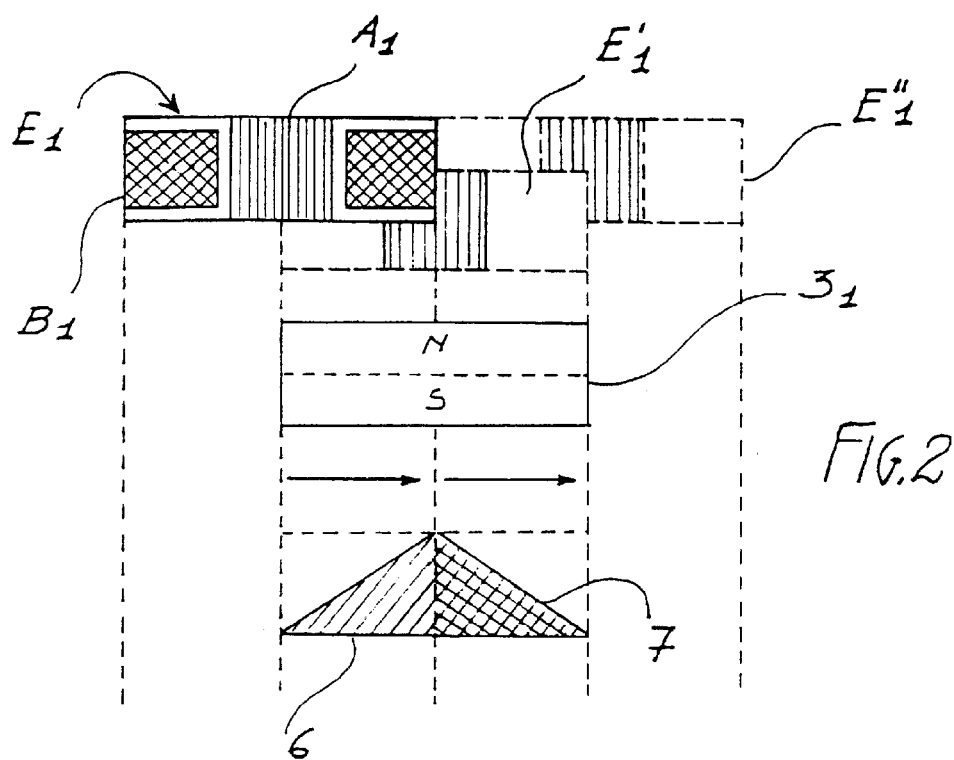
FIG. 2 shows the basic components of the dynamo-electric machine of FIG. 1 and a related diagram of the forces interacting between them.

In particular, in the case wherein the machine operates as a motor, in FIG. 2 the indications $A_1$ and $B_1$ denote respectively a ferromagnetic core and an electromagnetic coil of a polar expansion $E_1$ of the primary, and the indication $3_1$ denotes a permanent magnet of the secondary. For the sake of convenience, the relative motion of the polar expansion of $A_1$, $B_1$, with respect to the permanent magnet $3_1$ is considered, as if the rotor were fixed.

The ferromagnetic core of $A_1$ has high permeability so that it is attracted towards the permanent magnet $3_1$, by the "natural" ferromagnetic attraction when the coil $B_1$ is not energised. The polar expansion $E_1$ moves to $E_1'$. The corresponding energy is proportional to the surface area of the right triangle 6. The "artificial" electromagnetic repulsion when the coil $B_1$ is energised is proportional to the surface area of the triangle 7. The polar expansion $E_1$ moves to $E_1''$.

Figure 3:
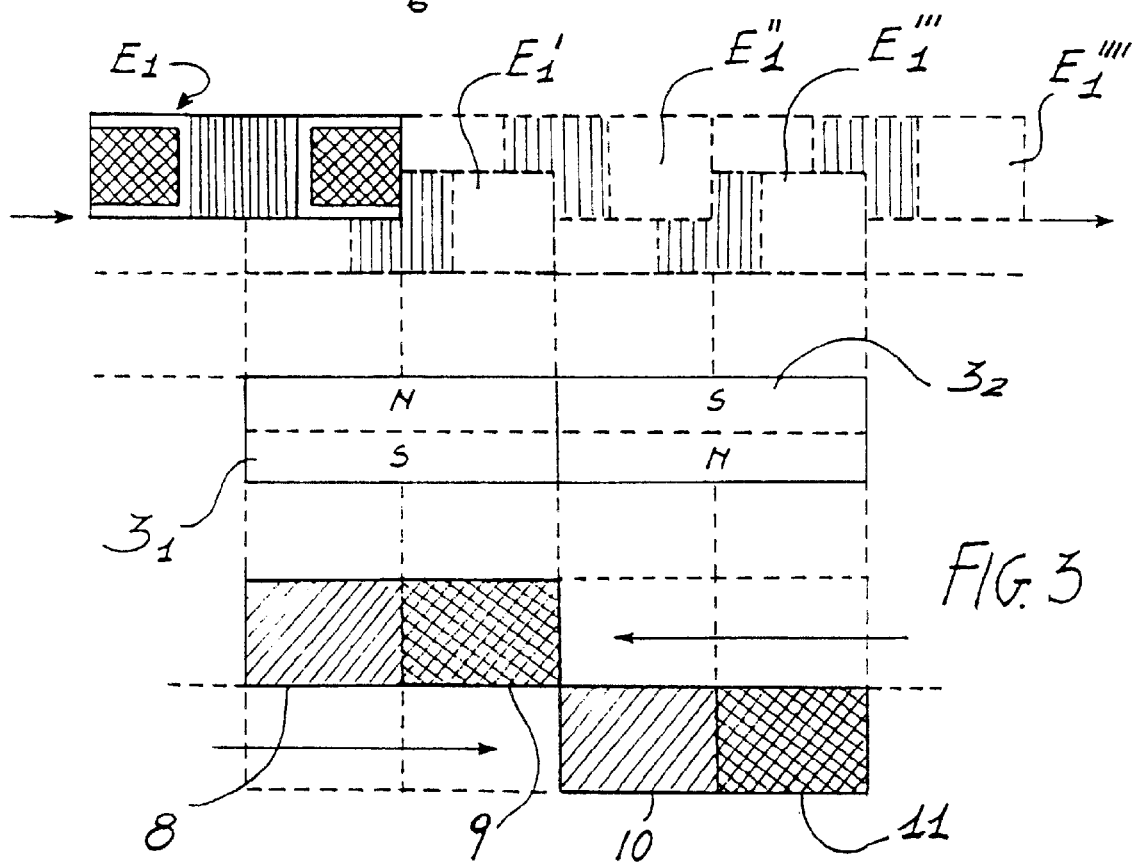
FIG. 3 schematically shows a complete attraction and repulsion cycle between the basic components of the dynamo-electric machine of FIG. 1.
Figure 4:
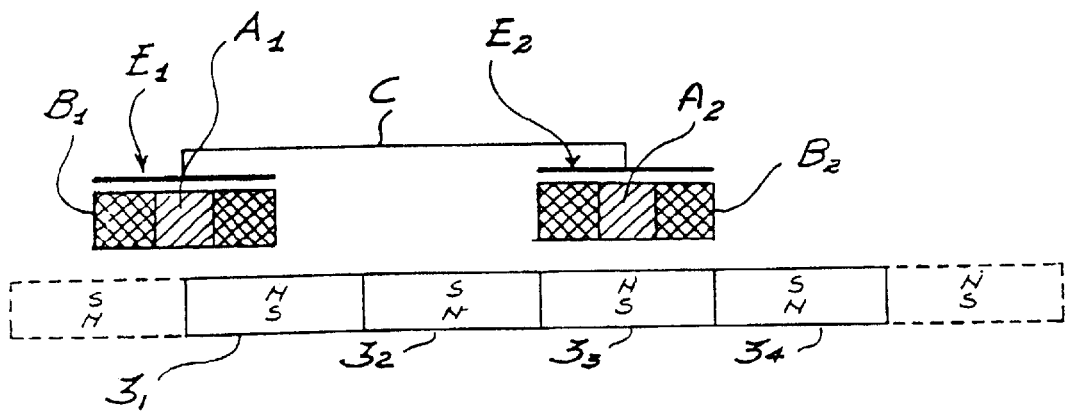
FIG. 4 schematically shows a complete cycle of attraction and repulsion between pairs of electromagnets and magnets.
Figure 4:
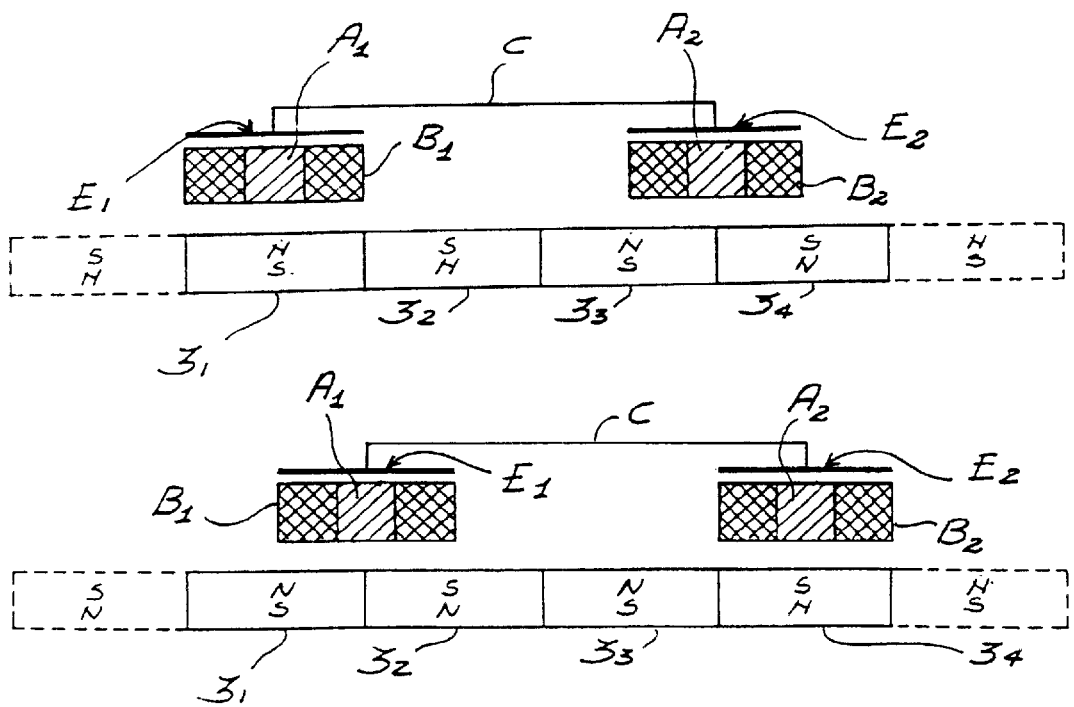
Figure 4:
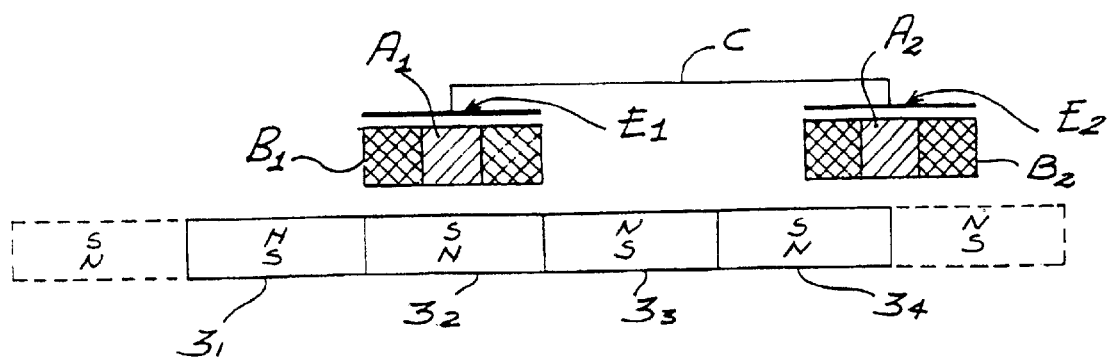
Figure 5:
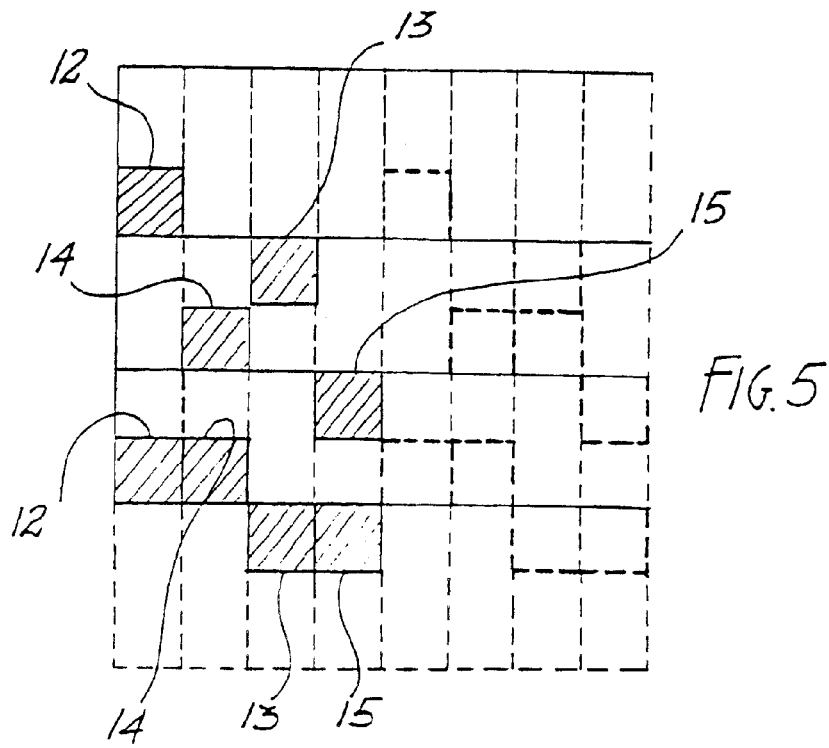
FIG. 5 shows a diagram of the electromagnetic energies at play in the cycle of FIG. 4.
Figure 6:
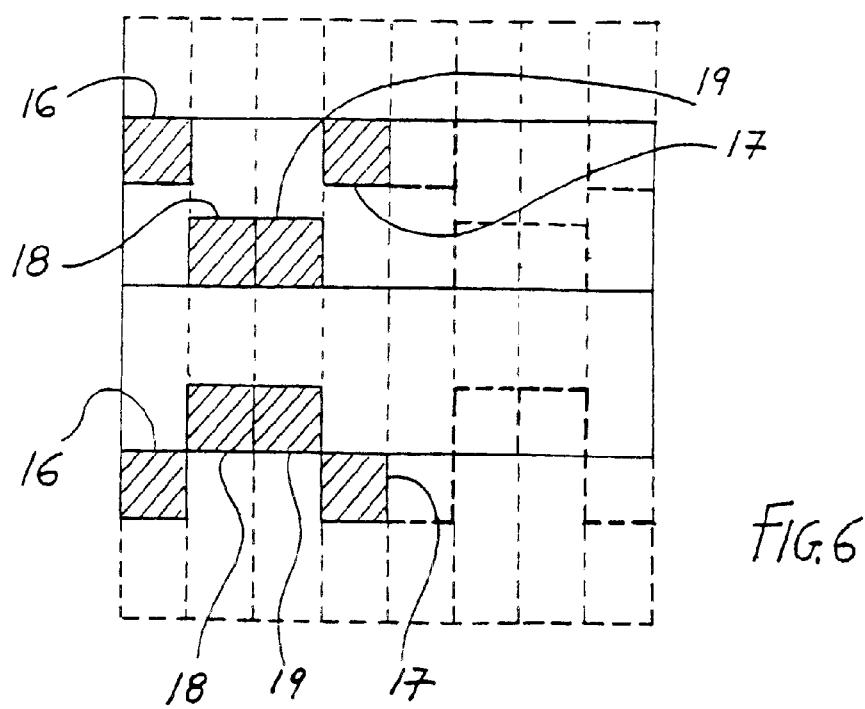
FIG. 6 shows a diagram of the ferromagnetic at play in the cycle of FIG. 4.

With reference to FIG. 3, a complete attraction and repulsion with alternating steps of a polar expansion $E_1$, with a pair of heteronomous permanent magnets $3_1$ and $3_2$ of opposite polarity, is shown schematically. The polar expansion $E_1$ moves to $E_1'$ by "natural" magnetic attraction between said permanent magnet $3_1$ and the ferromagnetic core $A_1$. The corresponding energy is proportional to the surface area of the rectangle 8. The "artificial" electromagnetic repulsion when the coil $B_1$ is energised with positive electrical power proportional to the surface area of the rectangle 9. The polar expansion $E_1$ moves to $E_1''$. Hence, by "natural" magnetic attraction with the permanent magnet $3_2$, the polar expansion $E_1$ moves to $E_1'''$. The corresponding energy due to "natural" permanent magnetic attraction is proportional to the surface area of the rectangle 10. Thus, the "artificial" electromagnetic repulsion when the coil $B_1$ is energised with negative electrical power, proportional to the surface area of the rectangle 11, takes the polar expansion $E_1$ to $E_1''''$, ready in attraction for another cycle. With reference to FIG. 4, the mechanical coupling (C) distancing the ferromagnetic cores $A_1$ and $A_2$ for the balance of the "natural" permanent magnetic attraction forces between a permanent magnet and the other ($3_1$, $3_2$, $3_3$, $3_4$, . . . ,) said ferromagnetic cores ($A_1$ and $A_2$) are distanced by a magnetic step p equal to half a permanent magnet, as in the motor shown by way of example in FIG. 1, or half permanent magnet plus one as in the scheme of the aforementioned example of a complete cycle FIG. 4, or half a permanent magnet plus a plurality of whole permanent magnets equally distanced (½, 1½, 2½, . . . ). Thus the "natural" ferromagnetic attraction torque forces are balanced and cancel each other out; moreover, the phase offset (p) between the coils ($B_1$ and $B_2$) by half permanent magnet has the purpose of completing with continuity the two parallel separate and superposed energy cycles over all the four steps necessary for the "natural" permanent attraction energy and to the "artificial" electromagnetic repulsion energy. Also schematically shown is the attraction cycle between the ferromagnetic cores $A_1$ and $A_2$ and the complete repulsion cycle of a pair of polar expansions $E_1$ and $E_2$ with the respective alternated heteronomous permanent magnets ($3_1, 3_2, 3_3, 3_4$) for each polar expansion $E_1$ and $E_2$ and each ferromagnetic core $A_1$ and $A_2$ one can repeat what has been stated with reference to FIG. 3, stressing again that, thanks to the half-magnet polar step (p), a harmonisation is reached between the "natural" magnetic forces and "artificial" electromagnetic forces, which leads to an increase in efficiency with respect to the case wherein power supply to the coils is continuous in the positive and respectively in the negative semi-cycle. The positive and negative electrical power supply cycle for the two coils of $E_1$ and $E_2$ is instead that of FIG. 5, detailed in 12, 13, 14 and 15 for four steps of a complete cycle. FIG. 6 instead shows the action of the ferromagnetic attraction forces in the same cycle steps 16, 17, 18, 19.

Therefore, when the dynamo-electric machine operates as a motor, each electromagnetic coil is powered with positive and negative electrical current or vice versa only for two separate fourths of cycle during a complete attraction and repulsion cycle on two successive heteronomous magnets.

To summarise, the dynamo-electric machine according to the invention has in its primary at least a pair of polar expansions, whereof one positioned opposing the centre of a permanent magnet of a series of alternated heteronomous permanent magnets of the secondary, and the other expansion positioned opposing astride two of said permanent magnets. The pair of polar expansions has a function of balancing and completing the fractioned cycle of linear electrical power supply at contiguous segments as well as the "natural" fractioned cycle separately (the coils of the expansions work only in repulsion on the output of half the permanent magnets; the highly permeable ferromagnetic cores work only in attraction on the input of half the permanent magnets).

In other words, the power supply of the polar expansions at alternating steps occurs when the ferromagnetic core is at the centre of a permanent magnet in negative feedback until the end of the permanent magnet, whilst in natural ferromagnetic attraction from the start of the permanent magnet to its centre, first one then the other linearly uniting the fractioned force cycle. The energy developed in the electrical power supply cycle and the one developed in the natural permanent magnetic cycle are added in interacting forces at the axis of the machine. The altenated power direct current power supply of the polar expansions and of at least one pair, first one and then the other expansion in negative feedback (repulsion) occurs at complete cycles and with continuous absorption and the "artificial" electrical energy is transformed into mechanical energy, whilst the attraction at alternating steps between the ferromagnetic cores of at least one pair and the permanent magnets at the input first one and then the other core, create a further "natural" mechanical energy superimposed and parallel, continuous and linear which is added at the axis with the transformed "artificial" energy. Vice versa, if the dynamo-electric machine of the present invention operates as a generator of mechanical energy the axis of the machine is powered with mechanical energy which is transformed into electrical current by each electromagnetic coil for two separate fourths of cycle each during a complete cycle, the energy produced is drawn by means of the control system during the conductor steps, whilst the "natural energy" of the neutral steps active in attraction add their energy to the mechanical one provided to the axis, with the result of a dual transformed energy and with total power relating to the sum of each separate cycle; or with the separate and direct withdrawal from the equally positioned coils belonging to the two superimposed energy cycles, in this case their electrical energy can be rectified before rejoining at the output, or re-phased.

The harmonisation of the aforementioned interacting forces characterises the "energy generator" invention as a high efficiency dynamo-electric machine.

Figure 7:
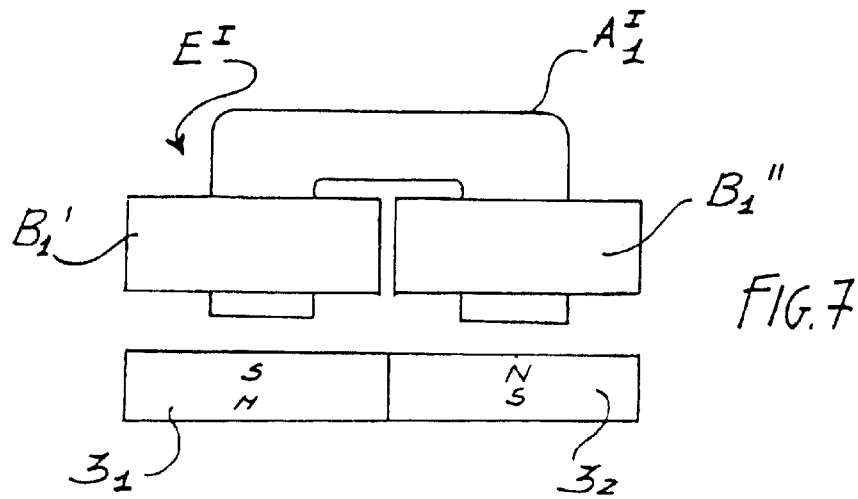
FIGS. 7 through 9 schematically show, in section view, respective different dispositions between primary electromagnets and secondary permanent magnets whereto the present invention can be applied.

With reference to FIG. 7, a schematic representation is provided of a first possible form of interaction of a polar expansion with closure of the magnetic flow and with a pair of heteronomous permanent magnets $3_1, 3_2$ in opposite position with the ferromagnetic core ($A_1'$), as in the example of FIG. 1, for rotatory and linear dynamo-electric machine, said polar expansion can be position both linear circular and longitudinally to the axis of the secondary with alternated heteronomous permanent magnets, in this case with double band.

Figure 8:
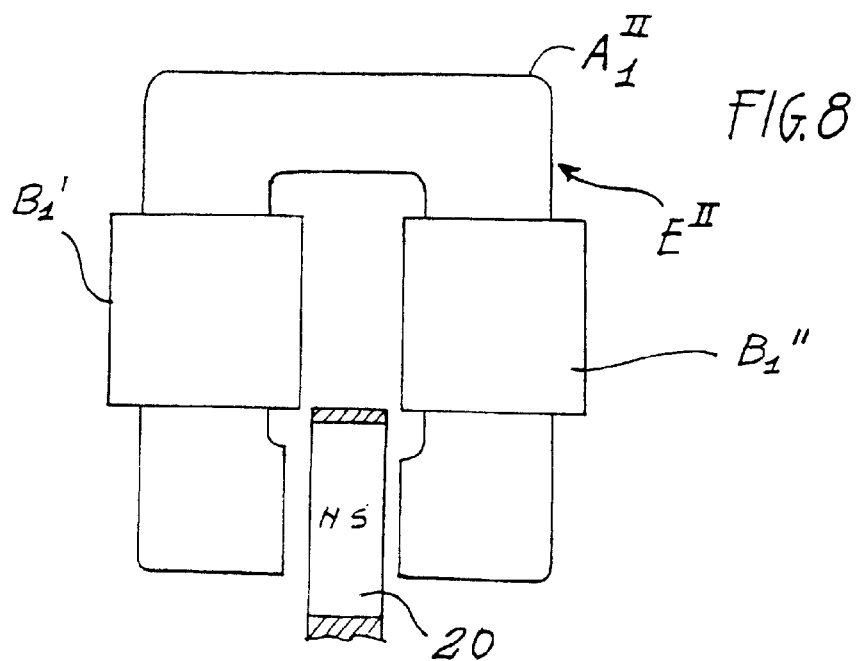

With reference to FIG. 8 the polar expansion E" has air gaps at both sides of a ferromagnetic core ($A_1''$) in axial disposition with respect to the band of the alternated heteronomous permanent magnets for the closure of the magnetic flow 20, as in the case of a so-called linear and linear annular motor.

Figure 9:
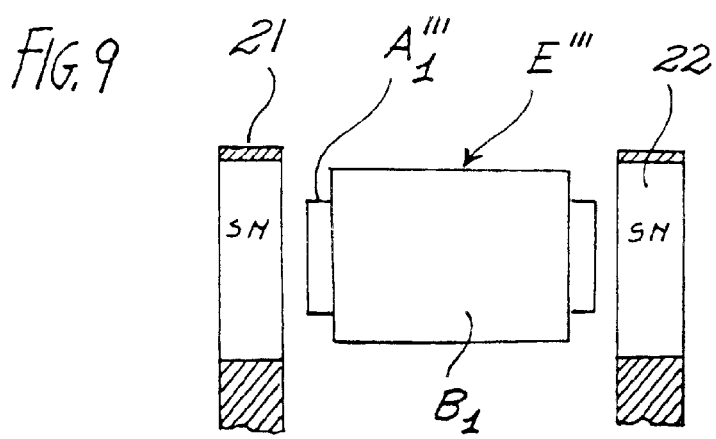

With reference to FIG. 9, the polar expansion E''' for the closure of the magnetic flow has permanent magnets at both sides of the ferromagnetic core ($A_1'''$) with two bands of alternated heteronomous permanent magnets 21, 22 belonging to two axial rotors or two linear tracks. Moreover, without references, it should be noted that for the construction and disposition of the polar expansions, of the ferromagnetic cores, of the permanent magnets and of its air gaps the realisation can be effected as in common and known dynamo-electric machines, it is just necessary according to the invention to respect the binomial of separation of the interacting flows to be harmonised with the alternating "artificial" electrical power supply of the active steps and of the neutral steps (not powered), which allow to exploit the "natural" potential attraction energy between the ferromagnetic cores and the permanent magnets always unbalanced in magnetic attraction step after step, main and necessary characteristic of the subject invention.

Purely by way of experimental, demonstrative, theoretical and practical example, the invention can be realised with two dynamo-electric machines with collector, appropriately and simply modified for the exploitation of the technique for separating the interacting forces constituting the subject of the invention: the two collectors are modified, each electrical polar step is divided into two steps, a neutral one and a conductor one, the axes of the two machines are fixed mechanically in series, forming a common mechanical axis, taking into account that it is necessary to offset by a polar step a collector of a machine with respect to the other one of the other machine, so that for instance in the case of a motor the electrical power supply powers at alternating polar steps first one machine and then the other, transforming the electrical energy from "artificial" repulsive electromagnetic force into mechanical energy, whilst the natural magnetic potential energy of the neutral polar steps in ferromagnetic attraction creates an additional "natural" mechanical energy parallel and superimposed with a resultant at the axis given by the sum of the energies at play, separated and mutually harmonised: "artificial" plus "natural".

The invention thus conceived can be subject to numerous modifications and variations, without thereby departing from the scope of the inventive concept.

What is claimed is:

1. A dynamo-electric machine with separate and harmonized employment of positive and negative interacting forces, said machine comprising:

a primary (2) comprising at least one pair ($C_1$, $C_2$) of pole groups ($E_1$, $E_2$; $E_3$, $E_4$), with the pole groups of the at least one pair being mechanically spaced apart and electrically offset from one another by a pole distance (p), wherein each pole group comprises a ferromagnetic core ($A_1$, $A_2$, $A_3$, $A_4$) and at least an electromagnetic coil ($B_1$, $B_1'$, $B_2$, $B_2'$; $B_3$, $B_3'$, $B_4$, $B_4'$);

a secondary (3) comprising a succession of permanent magnets ($3_1$, $3_2$, ..., $3_{10}$) that alternate in polarity from one permanent magnet to the next in a given direction; and a control system (5) connected for controlling the energization of said at least an electromagnetic coil of each said pole group by alternately supplying energizing current during successive energizing time periods ($p_1$) and halting the supply of energizing current to said at least one electromagnetic coil during successive de-energizing time periods ($p_2$) that alternate with the energizing time periods, wherein each said pole distance corresponds to (n+½) times the dimension of a permanent magnet in the given direction, where n=0 or a positive integer, and the energization control performed by said control system causes electromagnetic forces between said primary and said secondary to be balanced by permanent magnet forces for paired dispositions of the pole groups that are active separately during the energizing time periods and the ferromagnetic cores that are active separately during the de-energizing time periods, thereby neutralizing competing forces, in a succession of operating cycles composed of an electromagnetic energy component cycle superimposed on a ferromagnetic energy component cycle, and wherein said control system causes, during each cycle, said at least one electromagnetic coil to have at least one energizing time period and at least one de-energizing time period.

2. The machine of claim 1 wherein:

each of the component energy cycles is divided into four quarters, each quarter coinciding with a de-energizing time period acting on pairs of permanent magnets of opposite polarity ($3_1$, $3_3$, $3_5$, $3_7$, $3_9$ with $3_2$, $3_4$, $3_6$, $3_8$, $3_{10}$);

during each ferromagnetic energy component cycle, the ferromagnetic cores of the pair ($C_1$, $C_2$) are active in succession during alternating de-energizing time periods ($p_2$) for two separate cycle quarters each in a complete cycle;

during each electromagnetic energy component cycle, the pole groups of the pair are also active in succession during the alternating energizing time periods ($p_1$) for two separate cycle quarters each in a complete cycle; and said control system (5) switches the de-energizing time periods ($p_2$) and the energizing time periods ($p_1$) alternatively on one or the other coil that interacts with the permanent magnets.

3. The machine of claim 1, constituting a motor, wherein each electromagnetic coil ($B_1$, $B_1'$, $B_3$, $B_3'$; $B_2$, $B_2'$, $B_4$, $B_4'$) is powered with positive and negative electrical current only for two separate cycle quarters during a complete ferromagnetic cycle on two successive permanent magnets during the energizing time periods ($p_1$), switched by the control system (5), to transform electromagnetic energy into mechanical energy, and ferromagnetic energy is transformed into mechanical energy cycle by interaction between said ferromagnetic cores and said permanent magnets during the de-energizing time periods ($p_2$), and the-mechanical energy transformed from the electromagnetic energy is added to the mechanical energy transformed from the ferromagnetic energy.

4. The machine of claim 1, constituting a generator of electrical energy, wherein one of said primary and secondary is a rotor having an input shaft to which mechanical energy is supplied to rotate said shaft, wherein the mechanical energy is transformed into electrical current in each electromagnetic coil ($B_1$, $B_1'$, $B_3$, $B_3'$; $B_2$, $B_2'$, $B_4$, $B_4'$) for two separate quarters of each electromagnetic energy component cycle, which current is drawn through the control system (5) during the energizing time periods ($p_1$), while during the de-energizing time periods ($p_2$), ferromagnetic forces between said magnets and said cores produce mechanical energy that is added to the mechanical energy supplied to said shaft, with total power relating to the sum of each separate cycle.

5. The machine of claim 1 wherein the pole groups ($E_1$ ...) of the primary (2) are mechanically distanced from each other by a double pole distance ($p_1+p_2$) equal to an entire permanent magnet and all opposing the center of the alternated permanent magnets ($3_1$, $3_2$, ...) of the secondary (3), while the working step (p) is always of a quarter of a cycle, equal to half a permanent magnet, the energy at play in the two separate cycles is not superimposed but dovetailed and in cyclical successions, for two separate cycle quarters between the ferromagnetic energy ($E_1'$, $E_1'''$) and for two other separate cycle quarters (9, 11) with the electromagnetic energy ($E_1''$, $E_1''''$) for a complete cycle, alternate by contiguous of four quarters, all controlled by a system that electrically connects the coils at alternating steps (p), a conductor step ($p_1$) and a neutral step ($p_2$) in cyclical sequence.

6. The machine of claim 1 wherein one of the primary (2) and the secondary (3) is a stator and the other one of the primary (2) and the secondary (3) is a rotor.

7. The machine according to claim 1, wherein the pole groups ($E_1$, $E_2$, $E_3$ and $E_4$) of the primary (2) are positioned longitudinally to an axis of motion (23) of said machine with the secondary (3) and opposite to permanent magnets ($3_1$, $3_2$), which also positioned longitudinally and in alternated succession ($3_1$ and $3_2$, $3_3$ and $3_4$, $3_5$ and $3_6$, ...).

8. The machine of claim 1 wherein the control system (5) comprises a collector with brushes that electrically connect the coils ($B_1$, $B_1'$, $B_3$, $B_3'$; $B_2$, $B_2'$, $B_4$, $B_4'$) of the pole groups ($E_1$, $E_3$; $E_2$, $E_4$) during energizing time periods with a switching frequency corresponding to one quarter of an operating cycle.

9. The machine of claim 1 wherein the control system (5) comprises a decoder of alternating pole distances (p) corresponding to energizing time periods ($p_1$) and de-energizing time periods ($p_2$), by optical, magnetic, resistive, inductive or other measuring systems which drive an electronic control system with transistors, thyristors, or triacs for alternating electrical conduction switching of the coils ($B_1$, $B_1'$, $B_3$, $B_3'$; $B_2'$, $B_4$, $B_4'$) relating to the pole groups ($E_1$, $E_3$; $E_2$, $E_4$), the switching occurring at time intervals corresponding to one-quarter of an operating cycle.

10. The machine of claim 1 wherein said pole group cores (A') are disposed opposite to said permanent magnets ($3_1$, $3_2$).

11. The machine of claim 1 wherein said pole group cores ($A_1''$) and said permanent magnets (20) are in an axial relationship to one another.

12. The machine of claim 1 wherein said pole group cores ($A_1'''$) are disposed axially opposite to pairs (21, 22) of said permanent magnets.

13. The machine of claim 1 wherein the disposition of the pole groups ($E_1$, $E_2$, $E_3$ and $E_4$) of the primary (2), of the permanent magnets ($3_1$, $3_2$ . . . ) of the secondary (3) and of the control system (5) is rotary, or linear, or linearly annular, and at leas one of the pole groups, the permanent magnets and the control system is composed of partial sectors for servo-controls destined to specific uses.

14. The machine of claim 1, comprising two dynamo-electric machines ($M_1$, $M_2$) that are coupled together and are mechanically and electrically offset by an amount corresponding to the rotation during one quarter of an operating cycle and mechanically fastened in line in a common axis (23) and which works through the control system (5) electrically switching first a dynamo-electric machine ($M_1$) then the other ($M_2$) for two separate quarters each (12, 13; 14, 15) in a complete cycle of four quarters of electromagnetic energy (12, 14, 13 and 15) during the energizing time periods ($p_1$) and four superimposed quarters of natural energy (16, 18, 19, 17) relating to the neutral pole distances ($p_2$).

15. The machine of claim 1, wherein: said control system (5) comprises a collector having conductive connection portions alternating with non-conductive portions; one conductive connection portion and one non-conductive portion together have an extent corresponding to a pole distances (p); each conductive connection portion has an extent corresponding to an energizing time period ($p_1$); each non-conductive portion has an extent corresponding to a non-energizing time period; and each coil is connected in succession to each conductive connection portion in alternation with each non-conductive portion in cyclical sequence for complete operating cycles of four quarters.

16. The machine of claim 1 wherein the permanent magnets ($3_1$, $3_2$, $3_3$, . . . $3_{10}$) that create the magnetic field are constituted by electromagnets excited electrically in negative feedback.

* * * * *